March 29, 1932.  B. R. WELLINGTON  1,851,744
CALCULATING APPARATUS
Filed Nov. 17, 1928   2 Sheets-Sheet 1
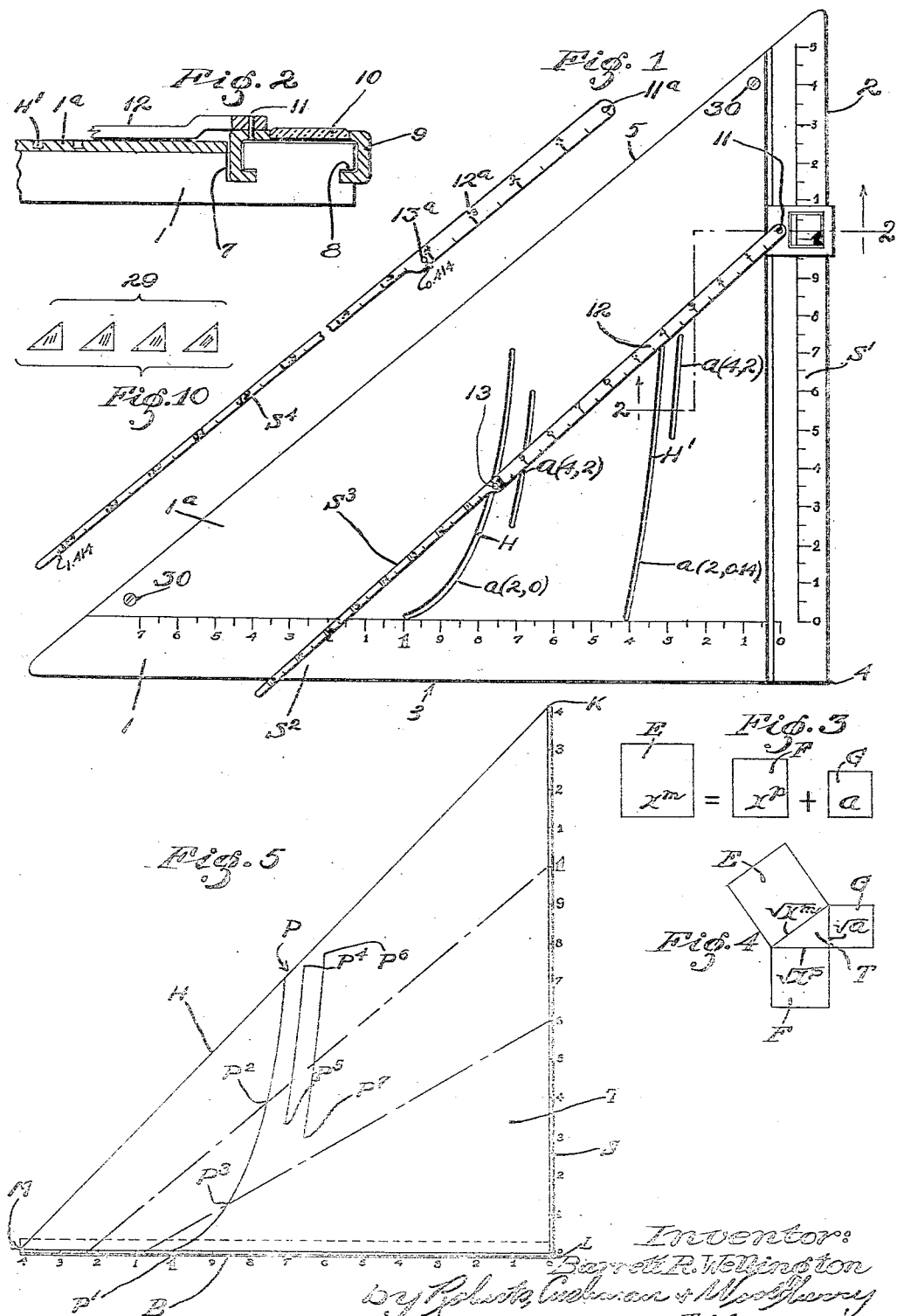

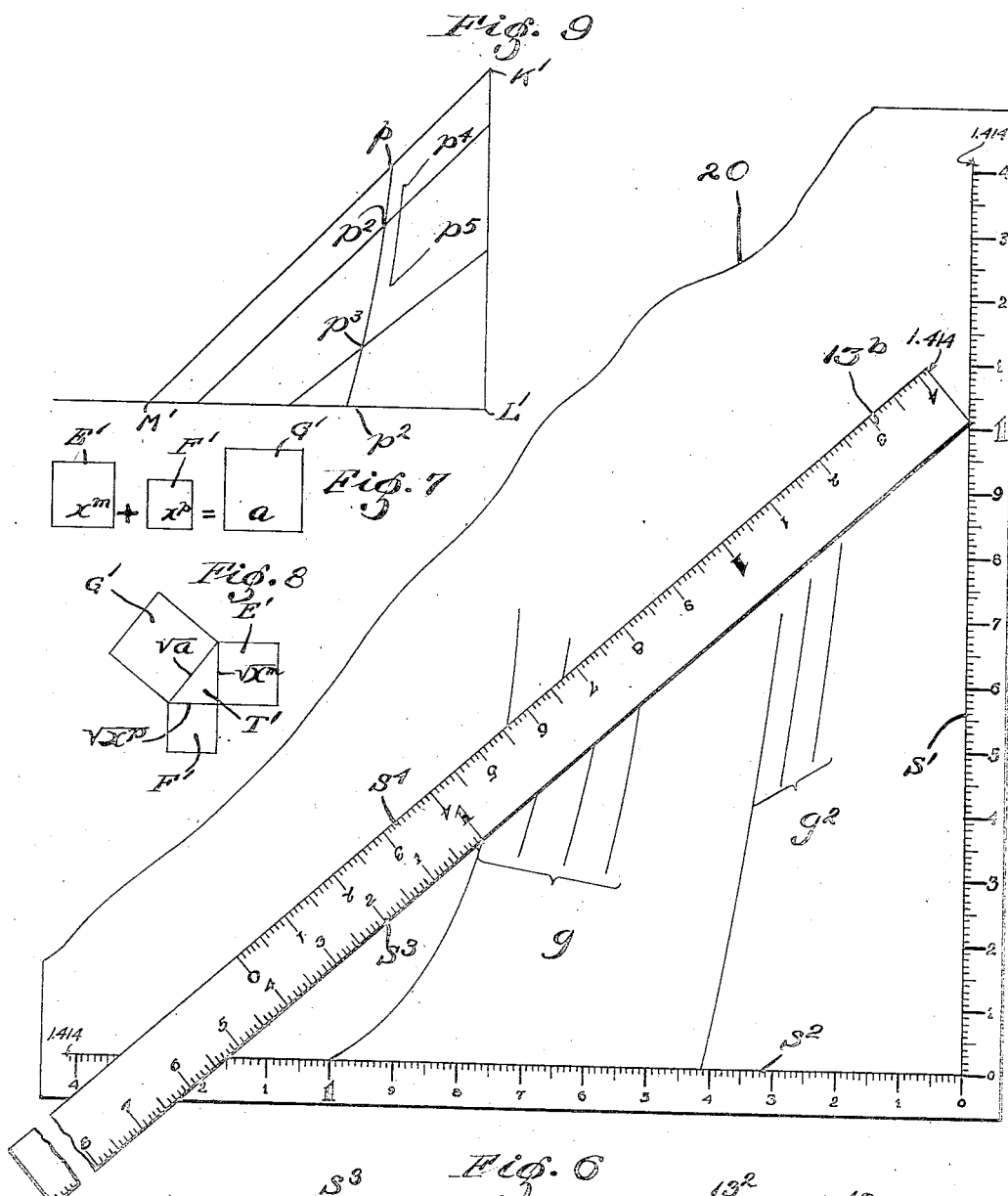
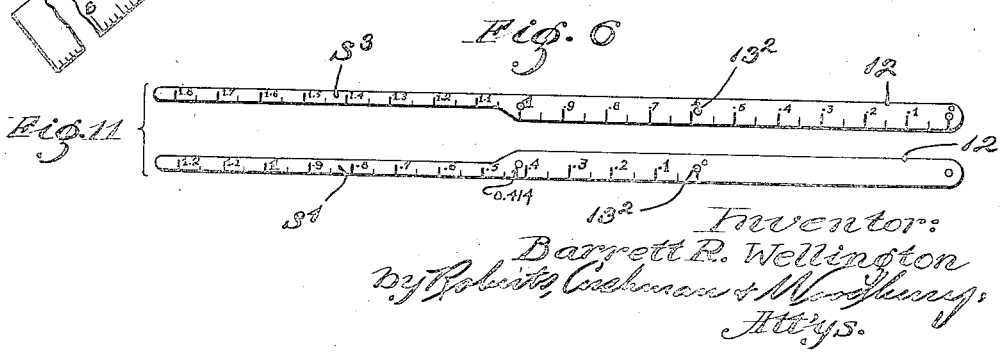

Patented Mar. 29, 1932

1,851,744

UNITED STATES PATENT OFFICE

BARRETT R. WELLINGTON, OF TROY, NEW YORK

CALCULATING APPARATUS

Application filed November 17, 1928. Serial No. 320,130.

This invention pertains to calculating apparatus of that type in which certain mathematical quantities are determined by the adjustment or manipulation of a mechanical element or elements and relates more particularly to apparatus for use in determining the roots of certain algebraic equations containing powers of the unknown quantity greater than 2, for example, cubic or biquadratic equations.

In certain branches of engineering it is frequently necessary to make calculations involving algebraic equations containing the cubes or higher powers of the unknown quantities, but the solution of such equations, if possible at all, is slow and laborious when performed by usual methods. It is possible to solve certain cubic equations by the application of Cardan's formula, and certain other cubics, biquadratics, and higher equations may be solved by methods of approximation familiar to mathematicians, but the time consumed in such methods and the possibility of error in long and complicated calculations is such that the average engineer looks upon the whole subject with dread.

I have now discovered that by relating the terms of certain algebraic equations to a proper geometrical figure, and by the provision of simple mechanical means based upon such relation, it is possible to obtain the roots of equations of the higher powers with the greatest ease and in many cases where it is substantially impossible to do so by purely mathematical methods.

Many of the higher power equations can, by substitution or other conversion methods, be reduced to the form $x^m \pm x^p = a$,—where $x$ represents a single unknown quantity, $m$ and $p$ are known, rational, positive exponents of $x$, and $a$ is a known constant.

For convenience, I will first describe the general principle underlying my invention with relation to an equation of the form $x^m = x^p + a$ and will thereafter describe certain desirable means for use in the application of the principle to this and other forms of equation. This underlying theory or principle of my invention, which I believe has not heretofore been recognized, or at least has not been put to any practical use, is that any algebraic equation of three positive terms may be considered as definitely related to a corresponding right triangle. Thus, if each term of the equation be considered to represent a certain area, the area represented by the single term on one side of the equation must be equal to the sums of the areas represented by the terms at the other side. In accordance with the Pythagorean theory of geometry, the square upon the hypotenuse of a right triangle is equal to the sum of the squares upon the other sides. Therefore, if the supposed areas representing the algebraic equation under discussion be considered as constituting the squares on the hypotenuse and sides respectively of a right triangle, it follows that the square-root of each individual term of the equation may be regarded as representing the length of one side of the triangle, the square-root of the single term at one side of the equation representing the hypotenuse, and the square-roots of the other terms representing the legs, respectively. Hence any equation of the form $x^m = x^p + a$, when $m$ and $p$ are any known, rational, positive integers (including unity, and with $m$ greater than $p$) and the value $a$ being any known positive rational quantity, may be represented as a right triangle.

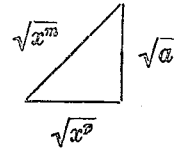

A little consideration will show that $$\sqrt{x^p}$$

must be greater than unity since, if it were less, $x$ would have a fractional value, $x^m$ and $x^p$ would be fractional, and as $m$ is by assumption greater than $p$, then $x^m$ would be less than $x^p$, or the hypotenuse would be less than the side; while if $$\sqrt{x^p}$$

equals unity, then $x^p = 1$ or $x = 1$ and $$\sqrt{x^m} = 1,$$

thus making the hypotenuse equal to the side, both of which results are evidently impossible.

Now let some value greater than unity be assumed for
$$\sqrt{a}$$
and a right triangle be constructed to any desired scale having this value of
$$\sqrt{a}$$
as one side, for example its vertical side, and with its base and hypotenuse representing values of
$$\sqrt{x^p}$$
and
$$\sqrt{x^m}$$
respectively. Then measuring from the upper end of the hypotenuse lay off on the hypotenuse a distance equal to unity of the scale chosen, marking the end of this unity segment. Likewise on the base mark off a distance from its junction with the vertical side a segment also representing unity of the selected scale, this distance representing the end of the unity segment of the hypotenuse when
$$\sqrt{a}=0.$$
Now solve the equation for values of
$$\sqrt{a}$$
between 0 and the first chosen value of
$$\sqrt{a},$$
and note the points at which the end of the unity segment of the hypotenuse of the several resulting triangles is found. It will be noted that all of these points representing the lower end of the unity segment of the hypotenuse may be connected by a smooth curve which forms the locus of the lower end of the unity segment of the hypotenuse for all values of
$$\sqrt{a}$$
between 0 and the value first selected.

Thus, by providing a right triangle having its sides
$$\sqrt{a} \text{ and } \sqrt{x^p}$$
fixed relatively and properly graduated, and by providing a movable hypotenuse, preferably also graduated, and having as described plotted the locus curve of the lower end of the unity segment of the hypotenuse, it is simply necessary, in solving any given equation for $x$, to determine the value of
$$\sqrt{a}$$
for the particular case, place the 0 graduation of the hypotenuse at the point corresponding to the determined value of
$$\sqrt{a}$$
on the graduated vertical side of the triangle, and then to swing the hypotenuse about this point as a center until the index denoting the lower end of the unity segment of the hypotenuse falls on the locus curve. The point of intersection of the hypotenuse with the base of the triangle is now noted, this point of intersection directly indicating
$$\sqrt{x^p}$$
on the base and
$$\sqrt{x^m}$$
on the hypotenuse, while the latter value divided by the former gives the expression
$$\frac{\sqrt{x^m}}{\sqrt{x^p}}.$$

If, as is common in equations of this general class, $m-p=2$, (for example, if $m=3$ and $p=1$) the expression
$$\frac{\sqrt{x^m}}{\sqrt{x^p}}$$
gives $x$ directly. Such a divisional determination of the value of the root is particularly valuable since it minimizes small errors in each individual reading and the resulting value of $x$ may readily be checked with the reading of
$$\sqrt{x^p}$$
on the base. At certain points hereinafter I shall refer to the expressions
$$\sqrt{x^p}$$
etc., as powers of the corresponding terms of the equation with the understanding that by "powers" I intend to include fractional powers.

Since the value
$$\sqrt{a}$$
may in practice vary from 0 up to any finite quantity, it is manifestly out of the question to provide a readable scale to which all such values could be referred, and accordingly I have, for convenience, chosen to use a triangle wherein the
$$\sqrt{a} \text{ side equals } \sqrt{2}.$$
Choosing units of proper magnitude to provide a triangle of convenient dimensions and accuracy, I may then convert any equation wherein
$$\sqrt{a} \text{ is greater than } \sqrt{2}$$
into proper form for use according to the following procedure: Assuming that the value $a$ lies between 2 and a higher limit $k$, and considering the extreme case where $x^m=x^p+k$, the equation may be divided by the lower limiting value 2,—so choosing $k$ that
$$\sqrt{\frac{k}{2}}=\sqrt{2},$$

or $k=4$. The graphic representation of the equation then becomes

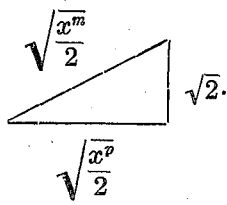

The end of the unity segment of the hypotenuse for various values between $a=2$ and $a=4$ may now be plotted to give a new locus curve which is evidently a continuation of the original locus curve but moved down within working limits. In a similar way other portions of the locus curve may be plotted as independent curves, choosing successively increasing values of $a$, each upper limit being such that the square-root of such upper limit divided by the square-root of the next lower limit will equal $$\sqrt{2}.$$

Such higher limits, based upon an original limit of $$\sqrt{a}=\sqrt{2},$$

form a geometrical series 2; 4; 8; 16; etc.

Considering an equation of the form $x^m + x^p = a$, it follows from the above discussion that in the corresponding triangle, $$\sqrt{a}$$

must represent the hypotenuse, $$\sqrt{x^m} \text{ and } \sqrt{x^p}$$

being the long and short legs respectively, except when $x$ is less than unity, when $$\sqrt{x^m} \text{ and } \sqrt{x^p}$$

become the short and long legs respectively. If, for example, $x$ be given the value of unity and $a=2$, then the hypotenuse of the triangle becomes

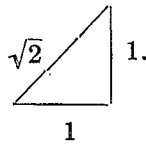

On the hypotenuse of such a triangle there is marked off a unity segment, measured from the lower end of the hypotenuse (or a segment $$\sqrt{2}-1$$

measured from the upper end). Taking the limiting value of $$a = \sqrt{2-1},$$

this marked point on the hypotenuse falls on the base of the triangle at a distance $$\sqrt{2}-1$$

from the right angle. For intermediate values, the locus of this point may be plotted, and a smooth curve drawn representing the position of this point for all intermediate values of $a$. Having prepared such a locus curve, I now make a movable hypotenuse provided with suitable graduations, the base and vertical side of the triangle also being graduated, and I provide the movable hypotenuse with an index point denoting the lower end of the $$\sqrt{2}-1$$

segment. For any equation of the type under consideration, and where the value of $a$ lies between $$\sqrt{2}-1 \text{ and } 2,$$

the index point on the hypotenuse is placed on the locus curve, the point on the hypotenuse representing $$\sqrt{a},$$

measured from the upper end of the hypotenuse, is caused to coincide with the graduated base of the triangle, and the value for $$\sqrt{x^m} \text{ and } \sqrt{x^p}$$

may now be read directly on the vertical and horizontal sides respectively of the triangle. For equations in which the value of $a$ is greater than 2, other locus curves may be prepared in a similar manner, and by division of the equation as previously described and with an original upper limit of $$\sqrt{a}=\sqrt{2},$$

successive upper limiting values of $a$ are found to follow the geometrical progression 2; 4; 8; etc.

While in the above discussion I have frequently made reference to the value $a=2$ as a convenient upper limit of the value of $a$, this is purely arbitrary, since the value of $a$ may equal any selected positive integer convenient for the purpose, and successive upper limits will follow corresponding geometrical progressions.

By known methods of algebraic reduction,—cubics of the form $y^3 \pm by^2 \pm cy = d$ may be reduced to the form $z^3 \pm ez = f$, and an equation of the latter form may readily be reduced to the form $x^3 \pm x = a$. In complete biquadratic equations of the form $z^4 \pm ez = f$ may be reduced to the form $x^4 \pm x = a$ and similar reductions may be made in the case of other powers, such reductions permitting the application of the above-described principles and the use of my apparatus in deriving the roots, all with great saving in time and increased accuracy in result.

In the accompanying drawings I have illustrated certain desirable types of apparatus embodying the principles of my invention and have indicated diagrammatically some of the relations above referred to, but I wish it to be understood that the apparatus herein specifically disclosed is merely by way of example and that apparatus of other specific forms may be provided in accordance with the principle of the invention without departing from the spirit of the invention.

In the drawings,

Fig. 1 is a plan view of one desirable form of my improved apparatus embodying a rigid base and mechanically guided elements for obtaining the desired results;

Fig. 2 is a fragmentary section, to larger scale, on the line 2—2 of Fig. 1;

Figs. 3 and 4 are diagrams illustrating the relation between the algebraic equations of the form $x^m - x^p = a$ and the corresponding geometrical figure as above referred to;

Fig. 5 is a diagram illustrating the method of determining the locus curve for a given equation of the form $x^m - x^p = a$;

Fig. 6 is a plan view of a second form of the apparatus comprising a chart and a movable hypotenuse which is not mechanically controlled;

Figs. 7 and 8 are diagrams similar to Figs. 3 and 4 but illustrating the application of my principle to equations of the form $x^m + x^p = a$;

Fig. 9 is a view similar to Fig. 5, illustrating the method of determining the locus curve for an equation of the form $x^m + x^p = a$;

Fig. 10 is a diagrammatic plan view, to small scale, illustrating the provision of interchangeable guide elements; and Fig. 11 is a view illustrating the upper and under sides of a preferred form of hypotenuse bar used in the apparatus of Fig. 1.

Referring to the drawings and particularly to Figs. 3 and 4, I have illustrated the equation $x^m = x^p + a$ as representing an equality of areas, where the area E equals the sum of the areas F and G. Considering these areas as squares, they may be assembled according to the Pythagorean theorem, as shown in Fig. 4, so as to define a triangle T whose hypotenuse and sides are represented by the quantities $$\sqrt{x^m}, \sqrt{x^p} \text{ and } \sqrt{a},$$

respectively.

I make use of this relation, as illustrated by way of example in Fig. 5, in the preparation of novel apparatus, useful in solving the above equation for the value of $x$. For convenience, I will first describe apparatus designed for solving an equation of the form $x^m = x^p + a$ where values of $a$ lie between 0 and a certain selected upper limit, for example 2, and let it be assumed that $x^p = a$.

First, upon an appropriate supporting element, for example a sheet of paper, celluloid, metal, or other desirable material, draw a right triangle K L M, having its right angle at L, making the length of the sides K L and L M each equal to the square-root of the selected upper limiting value of $a$. In the specific case illustrated this length of K L is $$\sqrt{2}.$$

This triangle may be made to any appropriate scale, and while of lesser dimensions in the accompanying drawings, I find that for practical purposes and to permit reading to the third decimal place, a scale upon which the square-root of 2 equals 14.142 inches is desirable.

Having constructed this triangle to the desired scale, the sides L K and L M are graduated, the 0 point being at L for each scale. Upon the hypotenuse I now accurately mark the index point P at the lower end of a segment of unity length measured from the upper end of the hypotenuse. The triangle constructed as above described evidently represents the equation $x^m = x^p + 2$.

Considering the case where $x^m = x^p + 0$, that is to say, when the side K L of the triangle is of 0 length, the index point P of the hypotenuse will fall at the point $P^1$ on base M L at unity distance from the point L. Now taking the $x^m = x^p + a$, substituting various values for $a$ intermediate 2 and 0, and solving for $x$ by known methods, a series of positions $P^2$, $P^3$, etc., of the index point of the hypotenuses of the corresponding triangles may be plotted. A line is now drawn connecting the points P, $P^2$, $P^3$, etc., and it is found that this line forms a smooth curve, evidently following a definite algebraic equation related to the original equation, although I have not thus far determined its mathematical form. The smooth curve P $P^1$ forms the locus of the index point on the hypotenuse for all values of $a$ between 0 and 2. By employing larger upper limits for $a$, the length of the curve P $P^1$ may be extended indefinitely, but for convenience I prefer to use the upper limit suggested and proceed as follows for higher values.

For solving equations by the use of the same triangle and hypotenuse when the value of $a$ lies between 2 and an upper limit $k$, I proceed as follows: Assuming the limiting case where $x^m = x^p + k$, I divide the equation by 2 and so select the value of $k$ which forms the upper limit that the $$\sqrt{\frac{k}{2}} = \sqrt{2},$$

or $k = 4$. The equation thus reduced may now be represented by the same triangle K L M, the vertical side K L remaining of the original value $$\sqrt{2},$$

as before, while the base M L represents a value of $$\sqrt{\frac{x^p}{2}}$$

and the hypothenuse represents the value of $$\sqrt{\frac{x^p}{2}}.$$

Taking now the limiting cases where $x^m = x^p + 4$ and $x^m = x^p + 2$ respectively, and marking the position of the index point P of the hypotenuse in each instance and then solving for several intermediate values of the $a$ term to determine other points, it is possible to draw a sector $P^4$, $P^5$ (Fig. 5) of the original locus curve but displaced downwardly from its normal position. Similarly for values of $a$ greater than 4 and less than 8, another displaced sector $P^6$, $P^7$ of the locus curve may be drawn, and in the same way other portions of the locus curve may be provided for further values of $a$.

I have above referred to the general procedure in determining the locus curve for equations of the form $x^m - x^p = a$, but now I will describe that employed in plotting the locus curve for an equation of the form $x^m + x^p = a$.

Referring to Figs. 7 and 8, the values $x^m$, $x^p$ and $a$ have been represented as areas E', F' and G' respectively, similarly to the illustration of Fig. 3, but here the sum of the two unknown terms equals the known term $a$. Accordingly, in constructing the triangle T', (Fig. 8) the area G' must form the hypotenuse and the areas E' and F', the sides, so that the hypotenuse of the triangle T' is represented by the value of $$\sqrt{a}$$

and the sides by the values $$\sqrt{x^m} \text{ and } \sqrt{x^p}$$

respectively.

Referring now to Fig. 9, I assume a limiting value of $a=2$ and that the value of $x$ is unity. I then construct a right triangle K' L'-M' wherein the hypotenuse equals $$\sqrt{2}$$

and each of whose legs is unity. On the hypotenuse I now mark the index point $p$, denoting the end of the unity segment measured from the lower end of the hypotenuse (or, in other words, the lower end of the segment $$\sqrt{2} - 1$$

measured from the upper end of the hypotenuse). Constructing a series of triangles with successively smaller values of $a$, the point K' gradually approaches the point L' until at the final value of $a=0.414$, the hypotenuse coincides with the base and the index point of the hypotenuse falls at the place $p^2$. Intermediate values of $a$ give other points $p^2$, $p^3$, etc. representing intermediate positions of the index point of the hypotenuse. A smooth curve drawn through these points forms the locus of the index point of the hypotenuse for all values of $a$ between 2 and 0.414.

To use the same triangle for solving equations in which the value of $a$ is greater than 2, it is possible to construct displaced segments $p^4$, $p^5$, etc., of the locus curve by first dividing the equation as above described with respect to equation $x^m = x^p + a$, choosing the limits in the same manner.

Referring now to Fig. 1, I have illustrated an instrument for use in solving equations of the above types as hereinafter more fully described. This instrument comprises a rigid base 1 of wood or other suitable material. Conveniently the base may be of generally right triangular form having the edges 2 and 3 meeting at the right angle 4, and having the hypotenuse edge 5. Parallel with the edges 2 and 3, I arrange accurately graduated scales $S^1$ and $S^2$ on the upper surface of the base. These scales may be printed, engraved, or otherwise impressed on the base itself, or upon sheet material, for example, celluloid, glass, or steel fixedly attached to the base. The scales are graduated from 0 points adjacent to the right angle 4, the graduations being of any practical degree of fineness which may be desired. For example, if the base be of such size as to permit the employment of a scale wherein 10 inches represents unity, it is readily possible to graduate it to thousandths of an inch. Upon such a scale, in accordance with my proposed procedure, the total length of the scale on the edge 2 is preferably 14.142 inches, and that on the edge 3 should be of equal or greater length, both scales being graduated in the same units.

Preferably I provide the base 1 with slots or grooves 7 and 8 (Fig. 2) for the reception of the opposite edges of a slide or cursor 9 similar to that employed upon a slide rule. This slider is free to move parallel to the edge 2 of the base but is retained in position by the engagement of its inturned edges with the grooves in the base. The slider 9 preferably has an aperture covered with a glass or other transparent panel 10 having a cross-hair or reference line which may be brought into accurate registry with any selected graduation of the scale $S^1$. The slider 9, as shown, carries an upwardly projecting pin 11, whose axis falls at the intersection of an extension of the cross-hair line on the panel 10 and a vertical line passing through the 0 point of scale $S^2$. This pin 11 is adapted to form a pivotal connection for the upper end of a movable hypotenuse bar or index member 12. This bar may be made of any suitable, preferably rigid, material, for example wood, metal or the like, and is provided with a journal opening at its upper end for the reception of the pin 11, such pin or opening constituting what is hereinafter referred to as an index element of the bar. At a point, distant from the axis of this opening equal to unity of the scale, I provide the hypotenuse bar 12 with a second index element, shown as a guide pin 13 adapted to engage a guide groove H in the base. The center line of this guide groove is initially laid out by the method above described with reference to Fig. 5 as the locus curve corresponding to an equation of the form $x^m = x^p + a$ for values of $a$ lying between the fixed limits 0 and 2. This groove is milled or otherwise cut into the substance of the base, being of such width that the pin 13 may fit snugly therein without lost motion and with its axis in the locus curve, but permitting free movement of the pin lengthwise of the groove. Instead of cutting the groove into the base, I contemplate forming it in an independent member which is then mounted on the base. Moreover, in place of a groove, I may employ simply a rib of thin material, for example steel, having the configuration of the proper locus curve and secured to the base in any desirable manner, and in such case the pin or follower member 13 may be slotted or otherwise shaped for cooperation with such rib. As a further alternative, I may substitute a fine pointed tracer for the guide pin 13, omitting the groove or other physical guide member altogether, and providing the base merely with an accurately drawn locus curve to which the tracer pin may be adjusted manually by observation.

The lower part at least of the bar 12 is graduated to form a scale $S^3$ having the same units as the fixed scales $S^1$ and $S^2$, the 0 point of this scale $S^3$ being at the point 11.

In using the instrument thus provided, it is simply necessary, in solving an equation of the form $x^m = x^p + a$, for the value of $x$, to determine the value of $$\sqrt{a},$$

then to place the hair line of the slider 9 on the corresponding reading of the scale $S^1$, and to read directly from the scale $S^2$ the corresponding value $$\sqrt{x^p}$$

at the intersection of the scales $S^3$ and $S^2$. Since the value $$\sqrt{x^m}$$

may also be read on the scale $S^3$, the correctness of the reading may readily be checked, and in case $m - p = 2$, the reading upon the scale $S^3$ may be divided by the reading upon the scale $S^2$, giving directly the value of $x$.

The base 1 may be provided with a series of grooves H corresponding to locus curves for a series of equations having increasing upper limits of the value of $a$, and thus the instrument may readily be adapted to solve any equation of the general class without necessitating changes in scale or proportion of parts, it being simply necessary to shift the pin 13 from one groove to another, the grooves being properly marked, if desired, to indicate the limits of $a$ to which they correspond.

For use in solving equations of the type $x^m + x^p = a$, I may, as shown in Fig. 11, provide a second scale $S^4$ on the back of the bar 12, and by disengaging the bar from the pin 11 and reversing it, at the same time shifting guide pin 13 to a hole $13^2$, the scale $S^4$ may be used in solving equations of the latter type. Alternatively I may provide a second hypotenuse member $12^a$ (Fig. 1), which may be substituted for the above-described member 12 by disengaging the latter from its pivot pin 11 and causing the pin to enter the opening $11^a$ at the end of the member $12^a$.

As disclosed in Fig. 1 the base 1 is provided with a groove H', whose center line coincides with a locus curve such as the curve $p, p^2$ of Fig. 9, the particular groove shown being adapted for use in solving equations wherein the value of $a$ lies between $$(\sqrt{2} - 1)^2 \text{ and } 2.$$

To facilitate direct reading, I prefer to graduate the scale $S^4$ on the movable hypotenuse or index member, beginning with zero at the point $11^a$, the total length of the scale $S^4$ being $$1.414 \text{ (or } \sqrt{2}\text{),}$$

the follower pin or tracer $13^a$ being located at the point $$0.414 \text{ (or } \sqrt{2} - 1\text{).}$$

In use, the value $$\sqrt{a}$$

for the particular equation is found on the scale $S^4$, and this point is moved along the edge of the fixed scale $S^2$ (the pin $13^a$ being disposed within the groove H') until the 0 point of scale $S^4$ or, more accurately speaking, the hair line on the slider coincides with the edge of the fixed scale $S^1$. When thus disposed, the value $$\sqrt{x^p}$$

is found on the scale $S^2$, and the value $$\sqrt{x^m}$$

on the scale $S^1$. By division of one value by the other, the value of $x$ may be found directly whenever $m - p = 2$.

Obviously the base may be provided with other curves similar to the curve H' for use with equations in which $a$ has a higher value than 2, such curves being found by the method above described in the discussion on Fig. 9.

It is clear that my method and apparatus may be applied to the solution of equations of other forms than those specifically considered, and if, as above suggested, the follower member 13 be merely a needle point which may be set manually to register with the locus curve, I contemplate that the curves may be provided upon a sheet or chart independent of the base and adapted to be movably mounted in accurate position thereon. In such event a set of curve sheets may be provided with each instrument, each sheet having locus curves corresponding to a certain type of equation. In the same way, when the follower member 13 or $13^a$ is adapted mechanically to follow the locus curve, as by entering a groove or engaging a rib, I may provide the groove or grooves in a member $1^a$ (Fig. 2) independent of the base proper and adapted to be mounted removably thereon. For example, if the base be of wood, the grooves may be formed in metal plates 29 (Fig. 10) of suitable thickness and having positioning screws 30 or other elements whereby they may be accurately mounted upon the base proper, and a set of such grooved plates may be provided with each instrument.

Among the equations for which such locus curves may readily be formed by the method above described, are the following: $x^3 - x^2 = a$; $x^3 + x^2 = a$; $x^4 - x = a$; $x^4 + x = a$; $x^4 - x^3 = a$; $x^4 + x^3 = a$; $x^5 - x = a$; $x^5 + x = a$; $x^5 - x^2 = a$; $x^5 + x^2 = a$; $x^5 - x^3 = a$; $x^5 + x^3 = a$; $x^5 - x^4 = a$; $x^5 + x^4 = a$; and since equations of many other forms may be converted into three term equations of the above general class, this method and the instrument (or instruments based upon the same general principle) is of wide utility.

Instead of the apparatus of Fig. 1, I may, if desired, provide a simpler embodiment, as shown in Fig. 6, wherein each locus curve sheet 20 may have printed directly thereon the scales $s^1$ and $s^2$ corresponding to the scales $S^1$ and $S^2$ above described. With these sheets I provide a movable hypotenuse $13^b$ which may consist simply of a strip of suitable stiff sheet material, for example paper, or may be in the form of a rigid, preferably bevel edged ruler of wood, celluloid, metal, or the like, having the scales $s^3$, $s^4$ marked thereon. Preferably in this case the scale $s^3$ corresponds to the scale $S^3$ above described and is used in cooperation with curves of the series $g$ for solving equations of the form $x^m - x^p = a$. On the other edge of the member $13^b$, the scale $s^4$, corresponding to the scale $S^4$ above described, may be employed, by reversing the member $13^b$, in connection with locus curves of the series $g^2$ for solving equations of the form $x^m + x^p = a$.

Since flexible sheets 20 may be made of large dimensions and may readily be rolled up for storage, this form of apparatus may be desirable in certain instances, particularly where it is requisite to use a scale reading to many decimal places.

In the above discussion I have employed the general forms of equations $x^m + x^p = a$ and $x^m - x^p = a$, since, as above stated, the method and apparatus is useful in solving equations of this general family, but probably the apparatus will find its greatest utility in the solution of cubic equations of the specific forms $x^3 + x = a$ and $x^3 - x = a$.

While I have described certain desirable physical embodiments of my invention, I wish it to be understood that the invention is not necessarily limited to the described construction, but that changes in size, proportion and relative arrangements of parts as well as the substitution of equivalents fall within the scope of the claims.

I claim:

1. Apparatus for use in solving algebraic equations of the general form $x^m \pm x^p = a$ comprising a fixed element and a relatively movable element whose position with reference to the fixed element denotes a power of one $x$ term of the equation, and means for determining the position of said movable element for any given value of the $a$ term between predetermined limits.

2. Apparatus for use in solving algebraic equations of the general form $x^m \pm x^p = a$ comprising a fixed and a movable element whose point of intersection denotes $$\sqrt{x^p},$$

and means for determining the position of said movable element for any value of $a$ between predetermined limits.

3. Apparatus for use in solving algebraic equations of the general form $x^m \pm x^p = a$ comprising a fixed scale upon which values of $$\sqrt{x^p}$$

may be read, an index member movable along said scale to indicate values of $$\sqrt{x^p},$$

and means for determining the position of said index member in accordance with any value of $a$ between predetermined limits.

4. Apparatus of the class described comprising a support having thereon fixed graduated scales disposed at right angles to one another and adapted to constitute the legs of any of a series of right triangles, a guide element upon the support, a movable member adapted to form the hypotenuse of any of said series of triangles, and spaced index elements on said movable member which are adapted respectively to register with one of said fixed scales and with the guide element.

5. Apparatus for solving algebraic equations of orders higher than two comprising a plurality of fixed graduated scales, and a movable member also having a graduated scale, the several scales being assigned to predetermined terms of the equation, and guide means so determining the position of said movable member for all values (within predetermined limits) of the constant term of the equation, that at the intersections of the movable member with said fixed scales the values of predetermined powers of the corresponding terms of the equation may be read.

6. Apparatus for solving algebraic equations of the general form $x^m \pm x^p = a$ comprising a pair of fixed graduated scales and a movable member also having a graduated scale, the several scales being assigned to the terms $x^m$, $x^p$ and $a$ respectively, and guide means so determining the position of said movable member for all values of $a$ within predetermined limits, that at the intersections of the movable member with the fixed scales the values $$\sqrt{x^m}, \sqrt{x^p} \text{ and } \sqrt{a}$$

may be read directly.

7. Apparatus for solving three-term algebraic equations containing a single unknown quantity and a constant term, said apparatus comprising a movable member having spaced index points, a fixed scale along which one of said index points is moved until it coincides with a value representing the square-root of the constant term, a second fixed scale, and means with which the second index point registers and which determines the point of intersection of the movable element with the second fixed scale, said intersection point denoting the value of the square-root of a power of the unknown term.

8. Apparatus for solving algebraic equations of the general form $x^m \pm x^p = a$ comprising a support having thereon fixed graduated scales disposed at right angles to one another and adapted to constitute the legs of any of a series of right triangles whose three sides are in proportion, respectively, to the square-roots of the three terms of the equation, a normally fixed guide element on the support, said guide element being the locus of the end of a unity segment, measured from one end of the hypotenuse, for all values of the $a$ term of the equation between predetermined limits, and index elements on said movable member adapted respectively to register with one of said fixed scales and with the guide element.

9. Apparatus for use in computing roots of algebraic equations of the form $x^m \pm x^p = a$, or equations which may be reduced to said form, comprising a supporting element having fixed graduated scales disposed at right angles to each other, a guide curve on the supporting element, and a movable graduated member adapted to form the hypotenuse of any of a series of right triangles of which said scales constitute the legs, said guide curve being so constructed and arranged that when a predetermined point of the movable member is placed in registry therewith, and a second predetermined point of said member is placed at a selected point of the other fixed scale, the three sides of the resulting triangle will be in proportion to $$\sqrt{x^m}, \sqrt{x^p} \text{ and } \sqrt{a}$$

respectively.

10. Apparatus for solving algebraic equations which can be reduced to a form containing but three terms with a single unknown quantity and a constant, said apparatus comprising a movable member having spaced index points, a scale along which one of said index points may be moved until it coincides with a value representing a power of the constant of the given equation, a normally fixed guide element with which the other index point of the movable member registers, and a second scale upon which a power of the unknown quantity of the equation may be read at the intersection of said latter scale and the movable member.

11. Apparatus for use in computing roots of algebraic equations of the form $x^m \pm x^p = a$, or equations which may be reduced to said form, comprising a supporting element having fixed graduated scales disposed at right angles to each other, guide curves on the supporting element, and an elongate movable member having two sets of graduations thereon for use in solving equations wherein the sign of $x^p$ is minus or plus respectively, said member being adapted to form the hypotenuse of any of a series of triangles of which the fixed scales are the legs, the guide curves constituting the loci of points at a predetermined distance from the end of one or the other scale on the movable member for all such triangles as $a$ varies between predetermined limits.

12. Means provided with a guide element for use in apparatus according to claim 4, said guide element having the characteristics of a curve constituting the locus of a point at unity distance from one end of the hypotenuse of a right triangle whose three sides are represented by $$\sqrt{x^m}, \sqrt{x^p} \text{ and } \sqrt{a}$$

(the latter quantities being related by the equation $x^m \pm x^p = a$) as the value $a$ varies between certain fixed limits.

13. Means provided with a plurality of guide elements for use in apparatus according to claim 4, said guide elements each having the characteristics of the locus of a point at unity distance from one end of the hypotenuse of a right triangle having the three sides $$\sqrt{x^m}, \sqrt{x^p} \text{ and } \sqrt{a}$$

(when $x^m$, $x^p$ and $a$ are related by the equation $x^m \pm x^p = a$) as the value of $a$ varies between fixed limits, said guide elements corresponding respectively to successive series of values of $a$ in which the upper limits of the several series are in geometrical progression.

14. Means provided with a guide element for use in apparatus according to claim 4, said guide element having the characteristics of a curve constituting the locus of a point at unity distance from one end of the hypotenuse of a right triangle whose hypotenuse and legs are represented by $$\sqrt{x^m}, \sqrt{x^p} \text{ and } \sqrt{a}$$

respectively, (the quantities $x^m$, $x^p$ and $a$ being related by the equation $x^m - x^p = a$) as the value $a$ varies between 0 and 2.

15. Apparatus for use in solving algebraic equations of the general form $x^m \pm x^p = a$ comprising a support, a slider movable in a predetermined path along said support, a fixed graduated scale for determining the position of the slider, a second fixed scale at right angles to the first, a hypotenus bar connected to the slider, and means for so guiding the movable hypotenuse bar, as the slider is moved along its scale, that the intersection of the bar with the other fixed scale and the position of the slider upon its scale denote, respectively, the square-roots of predetermined terms of the equation.

16. Apparatus for use in solving algebraic equations of the general form $x^m \pm x^p = a$ comprising a support, a slider movable in a predetermined path along said support, a fixed graduated scale for determining the position of the slider, a second fixed scale at right angles to the first, a hypotenuse bar pivotally connected to the slider, an index element on the hypotenuse bar, and guide means with which said index element registers, thereby so determining the position of the hypotenuse bar for any given position of the slider that the intersection of the bar with the second scale and the position of the slider on the first scale denote, respectively, the square-roots of two of the terms of the equation.

17. Apparatus for use in solving algebraic equations of the general form $x^m \pm x^p = a$ comprising a support, a slider movable in a predetermined path along said support, a fixed graduated scale for determining the position of the slider, a second fixed scale at right angles to the first, a hypotenuse bar pivotally connected to the slider, an index pin on the hypotenuse bar, said pin entering and being guided by a groove in a normally fixed part of the support, the groove being so shaped that as the slider is moved along its scale the intersection of the bar with the second fixed scale at all times denotes the square-root of one term of the equation, while the position of the slider denotes the corresponding value of the square-root of another term of the equation.

18. Apparatus for use in solving algebraic equations of the general form $x^m + x^p = a$ comprising a support, a slider movable in a predetermined path along said support, a fixed graduated scale for determining the position of the slider, a second fixed scale at right angles to the first, a hypotenuse bar pivotally connected to the slider, said bar having scale graduations upon its opposite faces and being reversible to permit each face to be used, an index element disposable at either of two predetermined distances from the pivotal axis of the bar, and normally fixed guide means on the support with which the index point of the bar registers in all positions of the slider, said guide means being so constructed and arranged that the intersection of the scale upon either face of the bar with the second fixed scale denotes the square-root of one term of the equation and the position of the slider denotes the corresponding value of the square-root of another term of the equation, the scales on the opposite faces of the bar being used in solving equations in which the sign of the $x^p$ term is minus and plus respectively.

19. Apparatus for use in solving algebraic equations of the general form $x^m + x^p = a$ comprising a support, a slider movable in a predetermined path along said support, a fixed graduated scale for determining the position of the slider, a second fixed scale at right angles to the first, a hypotenuse bar pivotally connected to the slider, an index element on the hypotenuse bar, a plurality of interchangeable members adapted selectively to be mounted upon the support, each of said interchangeable members being provided with a guide element corresponding to a selected range of values of the term $a$ of the equation, said guide element being so shaped that when the index element of the bar is registered therewith, the intersection of the bar with the second fixed scale denotes the square-root of one term of the equation and the position of the slider on its scale denotes the corresponding valve of the square-root of another term of the equation.

20. Apparatus for use in solving algebraic equations of the general form $x^m \pm x^p = a$ comprising a support, a slider guided to move in a predetermined path along said support, a fixed graduated scale for determining the position of the slider, a second fixed scale, a pivot element carried by the slider, a pair of interchangeable bars selectively engageable with the pivot element to swing about the latter as an axis, one of said bars having an index element at unity distance from the pivotal axis and the other having an index point at a distance $$\sqrt{a-1}$$

from the pivotal axis, and normally fixed guide means on the support with which the index point of the selected bar registers in all positions of the slider, said guide means being so constructed and arranged that the intersection of the bar with the second fixed scale denotes the square-root of one term of the equation and the position of the slider denotes the corresponding value of the square-root of another term of the equation, said bars being used respectively in solving such equations in which the sign of the $x^p$ term is minus and plus, respectively.

Signed by me at Troy, Rensselaer County, N. Y., this 9th day of November, 1928.

BARRETT R. WELLINGTON.